US011482054B2

(12) United States Patent
Maeda et al.

(10) Patent No.: US 11,482,054 B2
(45) Date of Patent: *Oct. 25, 2022

(54) SYSTEMS AND METHODS FOR ESTIMATING TRIP USE FOR A PROSPECTIVE VEHICLE

(71) Applicant: Honda Motor Co., Ltd., Tokyo (JP)

(72) Inventors: Eri Izumi Maeda, Rancho Palos Verdes, CA (US); David Wong Cun, Fountain Valley, CA (US)

(73) Assignee: HONDA MOTOR CO., LTD., Tokyo (JP)

(*) Notice: Subject to any disclaimer, the term of this patent is extended or adjusted under 35 U.S.C. 154(b) by 405 days.

This patent is subject to a terminal disclaimer.

(21) Appl. No.: 16/738,458

(22) Filed: Jan. 9, 2020

(65) Prior Publication Data

US 2021/0217252 A1 Jul. 15, 2021

(51) Int. Cl.
*G07C 5/00* (2006.01)
*G06Q 30/02* (2012.01)
*G07C 5/08* (2006.01)
*G06N 5/04* (2006.01)

(52) U.S. Cl.
CPC .............. *G07C 5/004* (2013.01); *G06N 5/04* (2013.01); *G06Q 30/0283* (2013.01); *G07C 5/085* (2013.01)

(58) Field of Classification Search
CPC ...................................................... G07C 5/004
See application file for complete search history.

(56) References Cited

U.S. PATENT DOCUMENTS

| 11,200,757 | B2* | 12/2021 | Maeda | B60W 40/12 |
|---|---|---|---|---|
| 2014/0074329 | A1* | 3/2014 | Yang | B60L 58/12 903/930 |
| 2019/0283593 | A1* | 9/2019 | Koebler | B60L 58/12 |
| 2021/0217252 | A1* | 7/2021 | Maeda | G07C 5/004 |

* cited by examiner

*Primary Examiner* — Michael A Berns
(74) *Attorney, Agent, or Firm* — Rankin, Hill & Clark LLP

(57) ABSTRACT

Systems and methods for estimating trip use for a prospective vehicle. In one embodiment, a method includes receiving trip log data for a first vehicle. The trip log data includes vehicle data associated with driving conditions for a plurality of trips. The method also includes identifying a pattern of travel for a set of trips of the plurality of trips. The trips of the set of trips are traveled from an origin to a destination. A trip of the set of trips has a path distance between the origin and the destination that exceeds a distance threshold. The method further includes calculating a predictive range estimate for a second vehicle for travel between the origin and the destination based on the path distance and the driving conditions associated with the set of trips.

20 Claims, 6 Drawing Sheets

SYSTEMS AND METHODS FOR ESTIMATING TRIP USE FOR A PROSPECTIVE VEHICLE

BACKGROUND

It can be difficult to choose a vehicle given the various features and styles of vehicle models, which are changing every year. This decision is made more difficult when trying to decide between a traditional gas-powered vehicle or adopting a new energy technology such as a hybrid vehicle or an electric vehicle. Consumers generally understand the benefits of moving to a new energy technology. However, consumers may also be apprehensive about integrating a vehicle with a new energy technology into their lives. The apprehension is further magnified by the pace at which new energy technologies are developing such that it is difficult to understand the limitation associated with adopting new energy technologies. Accordingly, public awareness and education have consistently been some of the biggest barriers to new energy technologies transforming the vehicle market.

BRIEF DESCRIPTION

According to one aspect, a computer-implemented method for estimating trip use for a prospective vehicle. The method includes receiving trip log data for a first vehicle. The trip log data includes vehicle data associated with driving conditions for a plurality of trips. The method also includes identifying a pattern of travel for a set of trips of the plurality of trips. The trips of the set of trips are traveled from an origin to a destination. A trip of the set of trips has a path distance between the origin and the destination that exceeds a distance threshold. The method further includes calculating a predictive range estimate for a second vehicle for travel between the origin and the destination based on the path distance and the driving conditions associated with the set of trips.

According to another aspect, a system for estimating trip use for a prospective vehicle includes a data receiving module, a pattern module, and a prediction module. The data receiving module receives trip log data for a first vehicle. The trip log data includes vehicle data associated with driving conditions for a plurality of trips. The pattern module identifies a pattern of travel for a set of trips of the plurality of trips. Trips of the set of trips are travelled from an origin to a destination. A trip of the set of trips has a path distance between the origin and the destination that exceeds a distance threshold. The prediction module calculates a predictive range estimate for a second vehicle for travel between the origin and the destination based on the path distance and the driving conditions associated with the set of trips.

According to still another aspect, a non-transitory computer readable storage medium stores instructions that, when executed by a computer, which includes at least a processor, causes the computer to perform a method for estimating trip use for a prospective vehicle. The method includes receiving trip log data for a first vehicle. The trip log data includes vehicle data associated with driving conditions for a plurality of trips. The method also includes identifying a pattern of travel for a set of trips of the plurality of trips. The trips of the set of trips are traveled from an origin to a destination. A trip of the set of trips has a path distance between the origin and the destination that exceeds a distance threshold. The method further includes calculating a predictive range estimate for a second vehicle for travel between the origin and the destination based on the path distance and the driving conditions associated with the set of trips.

DETAILED DESCRIPTION

Figure 1:
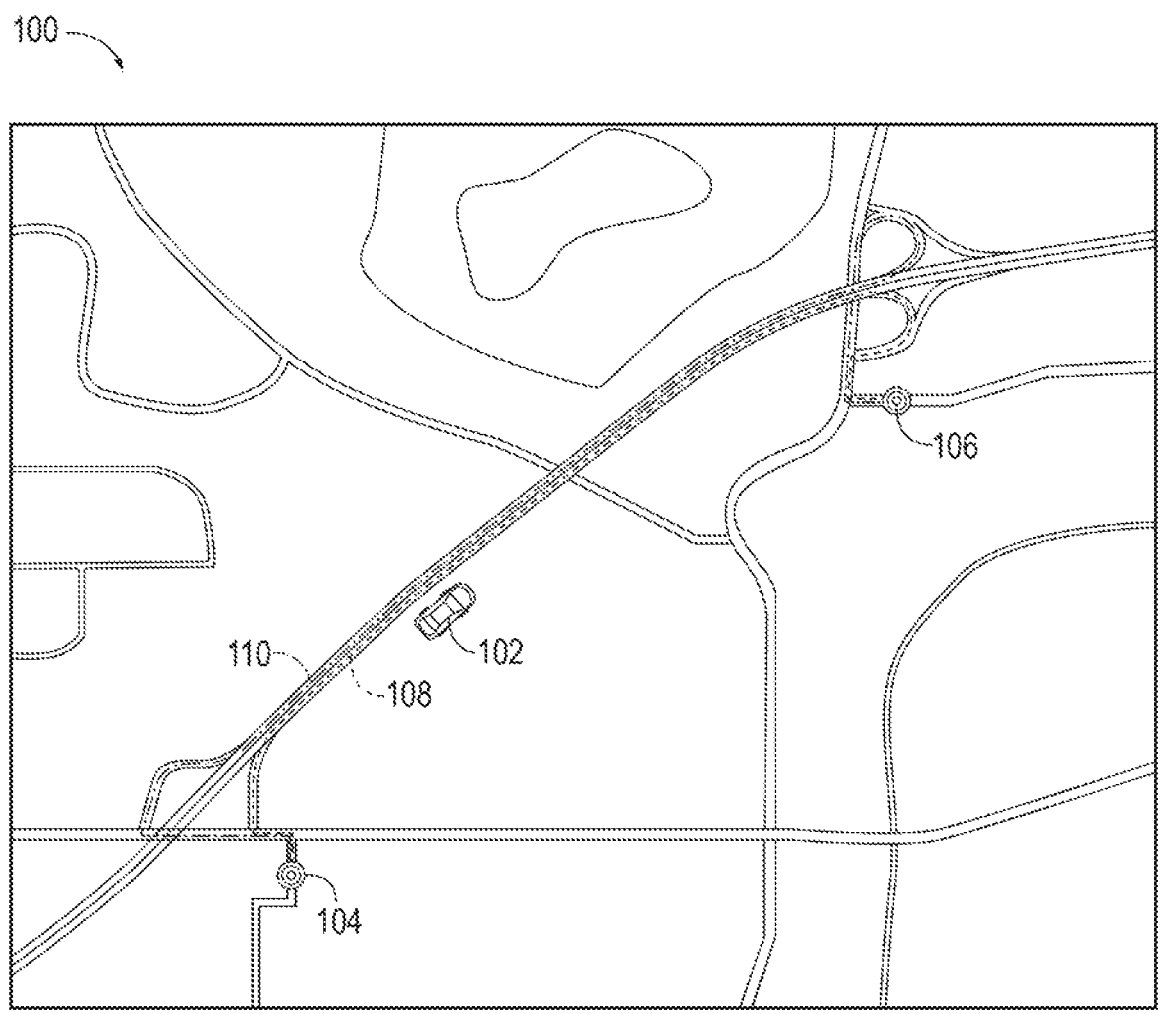
FIG. 1 is a schematic view of a driven vehicle in an exemplary traffic scenario according to an exemplary embodiment.

To educate consumers about the benefits of adopting a new energy technology, a consumer can be shown the advantages of the new technology in terms of their own life using the systems and methods described herein. New technologies typically allow vehicles to travel further on less energy. The distance that a vehicle can travel without having to reenergize (e.g., refuel, recharge, etc.) is the given range of the vehicle. However, the given range of the vehicle may vary based on motive energy consumption and parasitic energy consumption from non-motive vehicle systems of the first vehicle. The motive energy consumption may affect the range, for example, traveling uphill has a negative effect on the range. The parasitic energy consumption is energy consumption that does not contribute to the motion of the vehicle. For example, using the air conditioner may have a negative effect on the range due to the activation of vehicle systems that do not contribute to the motive force of the vehicle. This uncertainty of the given range propels range anxiety.

To combat range anxiety a consumer can be shown that a prospective vehicle can accommodate the consumer's routine travel. Suppose that a consumer frequently travels to the home of relatives 300 miles away. The consumer may be concerned that a prospective vehicle, such as an electric vehicle, cannot make a 300 mile trip without needing to be recharged. Here, rather than a given range, the consumer can be provided a personalized range based on their routine travel. The personalized range accounts for both the path distance to the relative's home and the driving style of the consumer. Because the personized range is specifically tailored to the consumer, the consumer can have confidence that the prospective vehicle will accommodate their needs.

Definitions

The following includes definitions of selected terms employed herein. The definitions include various examples and/or forms of components that fall within the scope of a term and that can be used for implementation. The examples are not intended to be limiting. Furthermore, the components discussed herein, can be combined, omitted, or organized with other components or into different architectures.

"Bus," as used herein, refers to an interconnected architecture that is operably connected to other computer components inside a computer or between computers. The bus can transfer data between the computer components. The bus can be a memory bus, a memory processor, a peripheral bus, an external bus, a crossbar switch, and/or a local bus, among others. The bus can also be a vehicle bus that interconnects components inside a vehicle using protocols such as Media Oriented Systems Transport (MOST), Controller Area network (CAN), Local Interconnect network (LIN), among others.

"Component," as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) can reside within a process and/or thread. A computer component can be localized on one computer and/or can be distributed between multiple computers.

"Computer communication," as used herein, refers to a communication between two or more communicating devices (e.g., computer, personal digital assistant, cellular telephone, network device, vehicle, vehicle computing device, infrastructure device, roadside equipment) and can be, for example, a network transfer, a data transfer, a file transfer, an applet transfer, an email, a hypertext transfer protocol (HTTP) transfer, and so on. A computer communication can occur across any type of wired or wireless system and/or network having any type of configuration, for example, a local area network (LAN), a personal area network (PAN), a wireless personal area network (WPAN), a wireless network (WAN), a wide area network (WAN), a metropolitan area network (MAN), a virtual private network (VPN), a cellular network, a token ring network, a point-to-point network, an ad hoc network, a mobile ad hoc network, a vehicular ad hoc network (VANET), a vehicle-to-vehicle (V2V) network, a vehicle-to-everything (V2X) network, a vehicle-to-infrastructure (V2I) network, among others. Computer communication can utilize any type of wired, wireless, or network communication protocol including, but not limited to, Ethernet (e.g., IEEE 802.3), WiFi (e.g., IEEE 802.11), communications access for land mobiles (CALM), WiMax, Bluetooth, Zigbee, ultra-wideband (UWAB), multiple-input and multiple-output (MIMO), telecommunications and/or cellular network communication (e.g., SMS, MMS, 3G, 4G, LTE, 5G, GSM, CDMA, WAVE), satellite, dedicated short range communication (DSRC), among others.

"Communication interface" as used herein can include input and/or output devices for receiving input and/or devices for outputting data. The input and/or output can be for controlling different vehicle features, which include various vehicle components, systems, and subsystems. Specifically, the term "input device" includes, but is not limited to: keyboard, microphones, pointing and selection devices, cameras, imaging devices, video cards, displays, push buttons, rotary knobs, and the like. The term "input device" additionally includes graphical input controls that take place within a user interface, which can be displayed by various types of mechanisms such as software and hardware-based controls, interfaces, touch screens, touch pads or plug and play devices. An "output device" includes, but is not limited to, display devices, and other devices for outputting information and functions.

"Computer-readable medium," as used herein, refers to a non-transitory medium that stores instructions and/or data. A computer-readable medium can take forms, including, but not limited to, non-volatile media, and volatile media. Non-volatile media can include, for example, optical disks, magnetic disks, and so on. Volatile media can include, for example, semiconductor memories, dynamic memory, and so on. Common forms of a computer-readable medium can include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Consumer," as used herein can include, but is not limited to, one or more entities, such as a human being or business, that has indicated an interest in obtaining some form of ownership of a vehicle. The forms of ownership may include buying, leasing, renting, sharing, etc.

"Database," as used herein, is used to refer to a table. In other examples, "database" can be used to refer to a set of tables. In still other examples, "database" can refer to a set of data stores and methods for accessing and/or manipulating those data stores. A database can be stored, for example, at a disk, data store, and/or a memory.

"Data store," as used herein can be, for example, a magnetic disk drive, a solid-state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

A "dealer," as used herein can include, but is not limited to, one or more entities, such as a human being or business, that provide opportunities for ownership of a vehicle, typically through a barter or pecuniary arrangement. The forms of ownership may include buying, leasing, renting, sharing, etc.

"Display," as used herein can include, but is not limited to, LED display panels, LCD display panels, CRT display, plasma display panels, touch screen displays, among others, that are often found in vehicles to display information about the vehicle. The display can receive input (e.g., touch input, keyboard input, input from various other input devices, etc.) from a user. The display can be accessible through various devices, for example, though a remote system. The display may also be physically located on a portable device, mobility device, or vehicle.

"Logic circuitry," as used herein, includes, but is not limited to, hardware, firmware, a non-transitory computer readable medium that stores instructions, instructions in execution on a machine, and/or to cause (e.g., execute) an action(s) from another logic circuitry, module, method and/or system. Logic circuitry can include and/or be a part of a processor controlled by an algorithm, a discrete logic (e.g., ASIC), an analog circuit, a digital circuit, a programmed logic device, a memory device containing instructions, and so on. Logic can include one or more gates, combinations of gates, or other circuit components. Where multiple logics are described, it can be possible to incorporate the multiple logics into one physical logic. Similarly, where a single logic is described, it can be possible to distribute that single logic between multiple physical logics.

"Memory," as used herein can include volatile memory and/or nonvolatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory can store an operating system that controls or allocates resources of a computing device.

"Module," as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module can also include logic, a software-controlled microprocessor, a discrete logic circuit, an analog circuit, a digital circuit, a programmed logic device, a memory device containing executing instructions, logic gates, a combination of gates, and/or other circuit components. Multiple modules can be combined into one module and single modules can be distributed among multiple modules.

"Operable connection," or a connection by which entities are "operably connected," is one in which signals, physical communications, and/or logical communications can be sent and/or received. An operable connection can include a wireless interface, a physical interface, a data interface, and/or an electrical interface.

"Portable device," as used herein, is a computing device typically having a display screen with user input (e.g., touch, keyboard) and a processor for computing. Portable devices include, but are not limited to, handheld devices, mobile devices, smart phones, laptops, tablets, e-readers, smart speakers. In some embodiments, a "portable device" could refer to a remote device that includes a processor for computing and/or a communication interface for receiving and transmitting data remotely.

"Processor," as used herein, processes signals and performs general computing and arithmetic functions. Signals processed by the processor can include digital signals, data signals, computer instructions, processor instructions, messages, a bit, a bit stream, that can be received, transmitted and/or detected. Generally, the processor can be a variety of various processors including multiple single and multicore processors and co-processors and other multiple single and multicore processor and co-processor architectures. The processor can include logic circuitry to execute actions and/or algorithms.

A "value" and "level", as used herein may include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

"Vehicle," as used herein, refers to any moving vehicle that is capable of carrying one or more users and is powered by any form of energy. The term "vehicle" includes, but is not limited to, cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is powered entirely or partially by one or more electric motors powered by an electric battery. The EV can include battery electric vehicles (BEV), plug-in hybrid electric vehicles (PHEV), and extended range electric vehicles (EREVs). The term "vehicle" can also refer to an autonomous vehicle and/or self-driving vehicle powered by any form of energy. The autonomous vehicle can carry one or more users. Further, the term "vehicle" can include vehicles that are automated or non-automated with pre-determined paths or free-moving vehicles.

"Vehicle system," as used herein can include, but is not limited to, any automatic or manual systems that can be used to enhance the vehicle, driving, and/or safety. Exemplary vehicle systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a steering system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, an interior or exterior camera system among others.

I. System Overview

Referring now to the drawings, the showings are for purposes of illustrating one or more exemplary embodiments and not for purposes of limiting the same. FIG. 1 is a schematic view of an exemplary traffic scenario on roadways 100 according to an exemplary embodiment. The roadways 100 can include any type of path, road, highway, freeway, or travel route. The roadways 100 can have various configurations not shown in FIG. 1. For example, the roadways 100 can have any number of lanes or use any number of routes. The roadways 100 are traversed by one or more vehicles, such as a first vehicle 102. The first vehicle 102 is a vehicle currently and/or previously used by a consumer (not shown). The first vehicle 102 may be powered by a conventional fuel such as unleaded gasoline or diesel fuel.

The roadways 100 illustrate paths the first vehicle 102 can travel from an origin 104 to a destination 106. Example routes from the origin 104 to and from the destination 106 are illustrated as the first trip 108 and the second trip 110. For example, the first vehicle 102 may embark on the first trip 108 by leaving the origin 104 and traveling to the destination 106. The first trip 108 may end at the destination 106 or continue to an additional destination. Suppose that the origin 104 is a residence of a consumer (not shown) and the destination 106 is a vacation home. The first trip 108 may be routine weekend trip. The second trip 110 may have the first vehicle 102 return from the destination 106 to the origin 104. In some embodiments, the first trip 108 and the second trip 110 may be combined as a round trip.

Data about the first trip 108 and the second trip 110 are stored as trip log data. For example, the trip log data may include the location of the origin 104, the destination 106, type of location, amenities of the origin 104 and the destination 106, the first start time, the first end time, the second start time, the second end time, route information, mileage, the travel time period, duration, information about vehicle systems, the consumer, and/or the roadways 100. While a single destination is discussed, the first vehicle 102 may take numerous trips in a single day to multiple destinations. Accordingly, the trip log data may include data about numerous trips over long periods of time (e.g., hours, days, months, years, etc.). The trip log data may be stored and utilized by an operating environment, such as operating environment 200 of FIG. 2.

Figure 2:
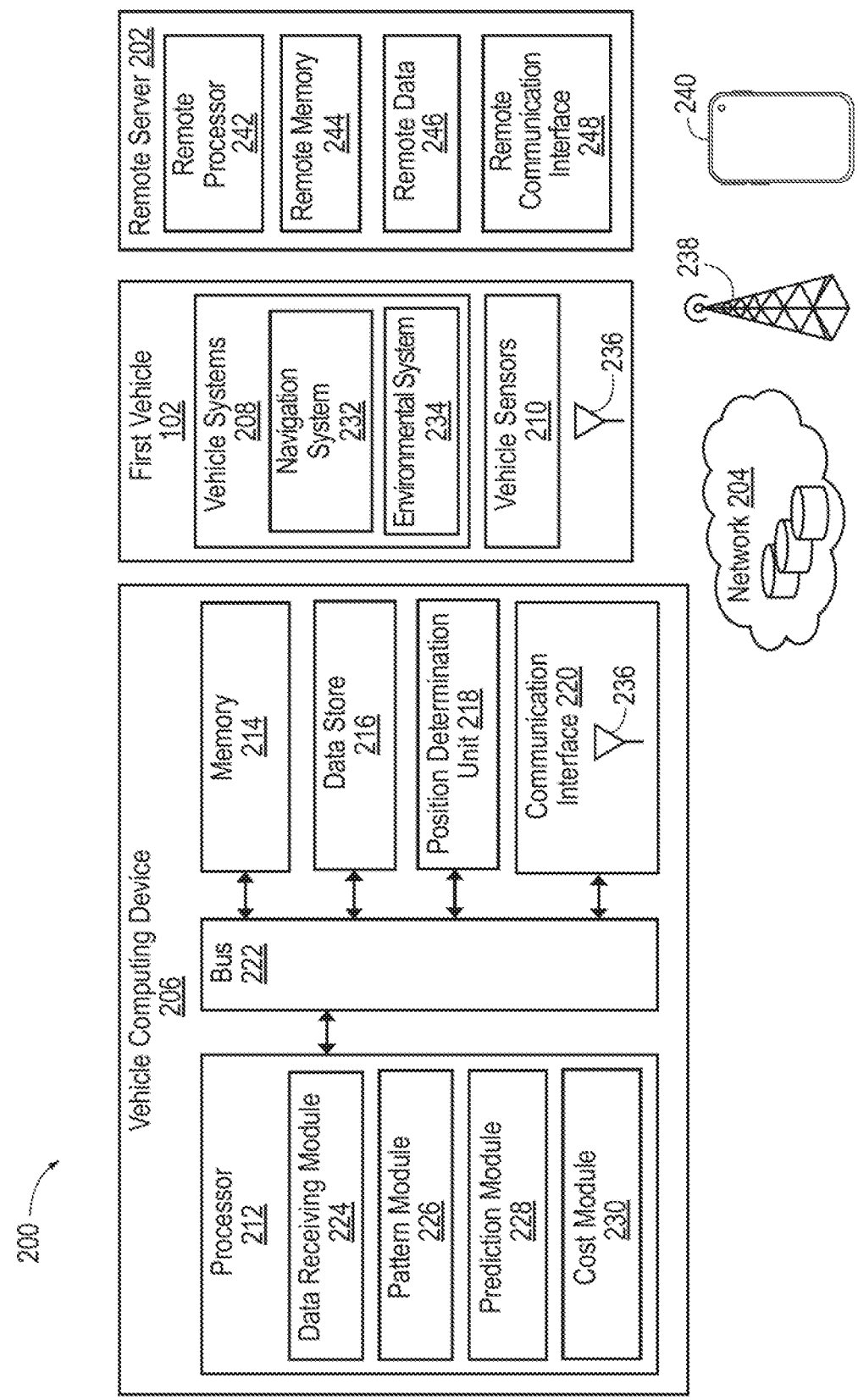
FIG. 2 is a block diagram of an operating environment for estimating trip use for a prospective vehicle according to an exemplary embodiment.

FIG. 2, a block diagram of the operating environment 200 estimating trip use for a prospective vehicle according to an exemplary embodiment. One or more of the components of the operating environment 200 can be considered in whole or in part a vehicle communication network. The first vehicle 102 communicates with a remote server 202 over a network 204. A vehicle computing device (VCD) 206 may be provided at the first vehicle 102, the remote server 202, or other remote location operably connected to the first vehicle 102 and/or the remote server 202 via the network 204. Vehicle systems 208 and vehicle sensors 210 communicate information about the first vehicle 102 to the VCD 206.

Generally, the VCD 206 includes a processor 212, a memory 214, a data store 216, a position determination unit 218, and a communication interface 220, which are each operably connected for computer communication via a bus 222 and/or other wired and wireless technologies defined herein. The VCD 206, can include provisions for processing, communicating, and interacting with various components of the first vehicle 102 and other components of the operating environment 200. In one embodiment, the VCD 206 can be implemented with the first vehicle 102, for example, as part of a telematics unit, a head unit, an infotainment unit, an electronic control unit, an on-board unit, or as part of a specific vehicle control system, among others. In other embodiments, the VCD 206 can be implemented remotely from the first vehicle 102, for example, with a portable device 240 or the remote server 202, connected via the network 204.

The processor 212 can include logic circuitry with hardware, firmware, and software architecture frameworks for remote control of the first vehicle 102 by multiple operators. Thus, in some embodiments, the processor 212 can store application frameworks, kernels, libraries, drivers, application program interfaces, among others, to execute and control hardware and functions discussed herein. For example, the processor 212 can include a data receiving module 224, a pattern module 226, a prediction module 228, and a cost module 230, although it is understood that the processor 212 can be configured into other architectures. The memory 214 and/or the data store 216 may store data about the first vehicle 102, such as the trip log data. Further, in some embodiments, the memory 214 and/or the data store 216 can store similar components as the processor 212 for execution by the processor 212.

The modules of the processor 212 may access the position determination unit 218 via the bus 222. The position determination unit 218 can include hardware (e.g., sensors) and software to determine and/or acquire position data about the first vehicle 102. For example, the position determination unit 218 can include a global positioning system (GPS) unit (not shown) and/or an inertial measurement unit (IMU) (not shown). Thus, the position determination unit 218 can provide a geo-position of the first vehicle 102 based on satellite data from, for example, a global position source (not shown), or from any Global Navigational Satellite infrastructure (GNSS), including GPS, Glonass (Russian) and/or Galileo (European). Further, the position determination unit 218 can provide dead-reckoning data or motion data from, for example, a gyroscope, accelerometer, magnetometers, among other vehicle sensors 210. In some embodiments, the position determination unit 218 can be a component of the navigation system 232 of the vehicle systems 208 that provides navigation maps and navigation information to the first vehicle 102.

The communication interface 220 can include software and hardware to facilitate data input and output between the components of the VCD 206 and other components of the operating environment 200. Specifically, the communication interface 220 can include network interface controllers (not shown) and other hardware and software that manages and/or monitors connections and controls bi-directional data transfer between the communication interface 220 and other components of the operating environment 200 using, for example, the network 204.

More specifically, in one embodiment, the VCD 206 can exchange data and/or transmit data, such as the trip log data, with other operably connected devices via a transceiver 236 or other communication hardware and protocols. For example, the transceiver 236 can exchange data with a vehicle occupant, consumer, or manufacturer of the first vehicle 102. In some embodiments, the first vehicle 102 can also exchange data (e.g., trip log data as will be described herein) over remote networks by utilizing a roadside equipment 238, and/or the network 204 (e.g., a wireless communication network), or other wireless network connections.

Referring again to the first vehicle 102, the vehicle systems 208 can include any type of vehicle control system and/or vehicle described herein to enhance the first vehicle 102 and/or driving of the first vehicle 102. Here, the vehicle systems 208 may include a navigation system 232 and an environmental system 234. The navigation system 232 stores, calculates, and provides route and destination information and facilitates features like turn-by-turn directions. The environmental system 234 may alter the in-cabin environment of the first vehicle 102. For example, the environmental system may control the air-conditioning, fans, heating, heated-seats, lighting, and audio-visual systems, among others to modify the consumer's experience.

The vehicle sensors 210, which can be implemented with the vehicle systems 208, can include various types of sensors for use with the first vehicle 102 and/or the vehicle systems 208 for detecting and/or sensing a parameter of the first vehicle 102, the vehicle systems 208, and/or the environment surrounding the first vehicle 102. For example, the vehicle sensors 210 can provide data about vehicles and/or downstream objects in proximity to the first vehicle 102. The vehicle sensors 210 can also provide data about the roadways 100 such as grade of the roadways, deviation of a surface of the roadways 100 from a true planar surface (i.e., smoothness), trajectory, etc. The vehicle sensors 210 can include, but are not limited to: acceleration sensors, speed sensors, braking sensors, proximity sensors, vision sensors, ranging sensors, seat sensors, seat-belt sensors, door sensors, environmental sensors, yaw rate sensors, steering sensors, GPS sensors, among others. It is also understood that the vehicle sensors 210 can be any type of sensor, for example, acoustic, electric, environmental, optical, imaging, light, pressure, force, moisture, thermal, temperature, proximity, among others.

Using the system and network configuration discussed above, a personalized range for a prospective vehicle can be estimated for a consumer considering previous trip use based on the trip log data of the first vehicle 102. The personalized range may be provided to the consumer to illustrate how a prospective vehicle can accommodate the consumer's current usage of the prospective vehicle. Detailed embodiments describing exemplary methods using the system and network configuration discussed above will now be discussed in detail.

II. Methods for Estimating Trip Use

Figure 3:
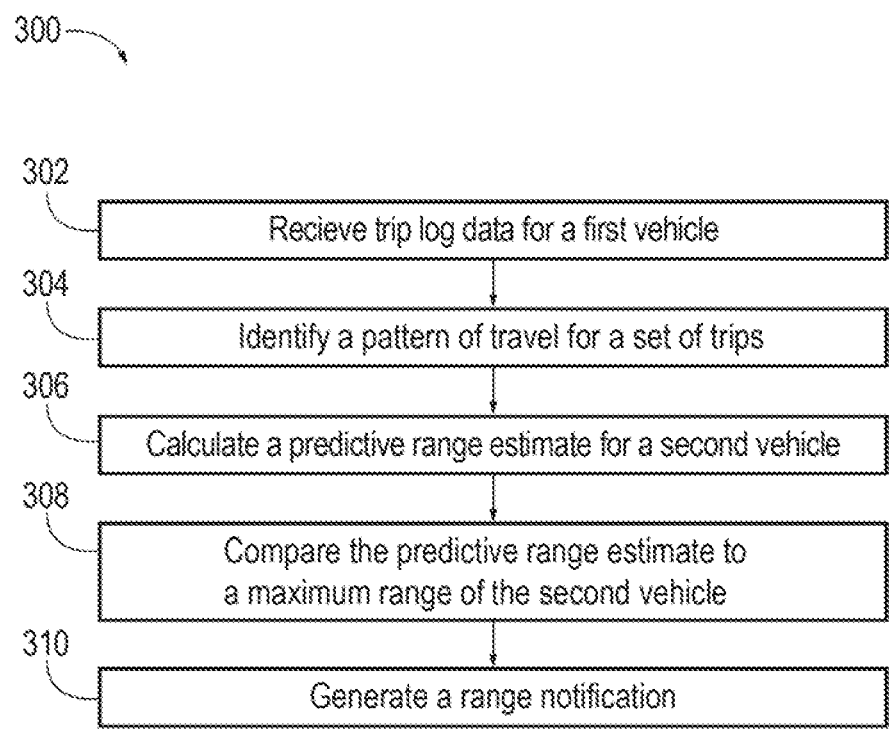
FIG. 3 is a process flow for estimating trip use for a prospective vehicle according to an exemplary embodiment.

Referring now to FIG. 3, a method 300 for estimating a prediction value for usage of a prospective vehicle according to an exemplary embodiment. FIG. 3 will also be described with reference to FIGS. 1, 2, 4, and 5. As shown in FIG. 3, the method 300 can be described by a number of steps for e estimating trip use for a prospective vehicle. For simplicity, the method 300 will be described by these steps, but it is understood that the steps of the method 300 can be organized into different architectures, blocks, stages, and/or processes.

Figure 4:
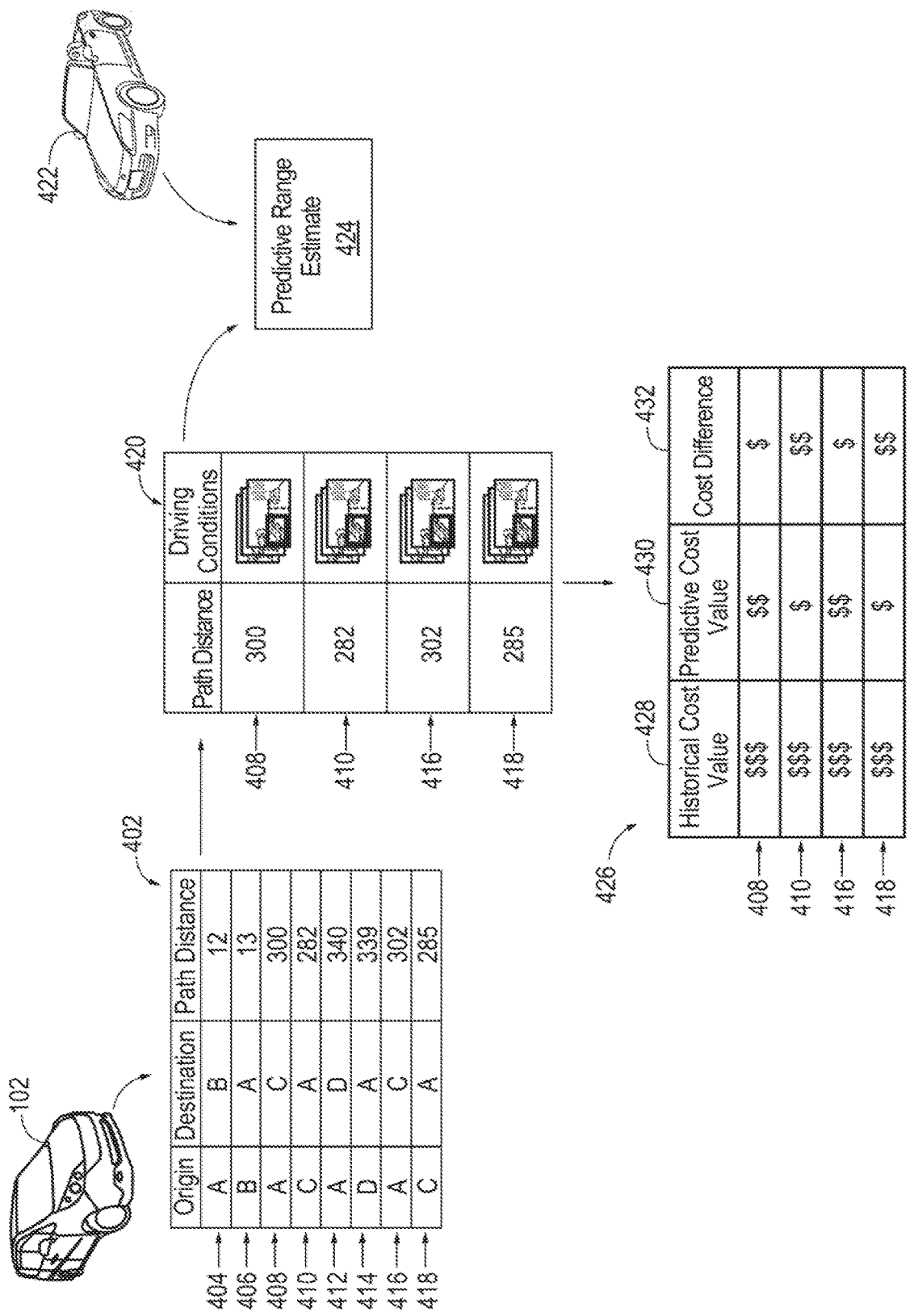
FIG. 4 is a block diagram of a data flow for estimating trip use for a prospective vehicle according to an exemplary embodiment.

At block 302, the method 300 includes the data receiving module 224 receiving trip log data associated with the first vehicle 102. The trip log data may be received from the first vehicle 102, the remote server 202, and/or the portable device 240 over the network 204. For example, the first vehicle 102 may maintain trip log data in a trip log 402, as shown in FIG. 4. The trip log data may include trip information regarding all the trips of the first vehicle 102 including trips between the origin 104 and the destination 106, among others.

The trip log 402 may include trip log data from the vehicle systems 208 and/or the vehicle sensors 210 of the first vehicle 102. For example, the trip log data may include image data from a vehicle sensor 210, such as a camera. The image data may include information regarding at least a portion of a route between the origin 104 and the destination 106. The trip log data may also include the grade of the roadways, deviation of a surface of the roadways 100 from a true planar surface (i.e., smoothness), trajectory, etc., as discussed above. The trip log data may include navigation data from the navigation system 232 of the first vehicle 102 or from the portable device 240. Additionally, the remote server 202 may include a remote processor 242 and a remote memory 244 that generate and/or store trip log data stored as the remote data 246. In one embodiment, the data receiving module 224 may access the remote data 246 via the remote communications interface 248 to access the trip log data.

The data receiving module 224 may receive the trip log data as the trip log 402. Additionally, the data receiving module 224 may also query and/or access trip log data on the first vehicle 102, the remote server 202, and/or the portable device 240. In another embodiment, the data receiving module 224 may calculate trip log data. For example, the data receiving module 224 may receive location data from the position determination unit 218 and identify a location of the origin 104 or the destination 106, thereby generating trip log data. As another example, the data receiving module 224 may calculate mileage or location type based on information from the navigation system 232. Accordingly, trip log data can be generated and received by the data receiving module 224.

The trip log data may also include a driving profile associated with the first vehicle 102. For example, the trip log data may include information about the manner in which a consumer (not shown) operates the first vehicle 102. Additionally or alternatively, the data receiving module 224 may determine the driving profile or supplement the driving profile based on the data received in the trip log data, the vehicle systems 208, or the vehicle sensors 210. For example, suppose that the driving profile includes categorizations of the consumer's driving style (e.g., power, sporty, aggressive, relaxed, fuel efficient, etc.), the data receiving module 224 may receive braking data from the vehicle sensors 210 to identify the consumer's driving style. Accordingly, the data receiving module 224 may assess and/or generate profile data associated with a driving profile based on vehicle data from the vehicle systems 208 and/or the vehicle sensors 210.

While the trip log 402 may include more or fewer entries, suppose that the trip log 402 includes a first trip 404, a second trip 406, a third trip 408, a fourth trip 410, a fifth trip 412, a sixth trip 414, a seventh trip 416, and an eighth trip 418. Here, for simplicity, the trip log 402 includes origin information, destination information, and a trip mileage for each trip. The origin information and the destination information may be a value indicative of the location. For example, the origin information and destination information may be a unique identifier assigned to the location. In another embodiment, the origin information and the destination information may be an address, coordinates, etc. The mileage is a measure of the length of the particular trip. While given here in miles, the trip log 402 may additionally or alternatively include other measures of distance such as duration.

At block 304, the method 300 includes the pattern module 226 identifying a pattern of travel for a set of trips 420 of the plurality of trips. For example, the set of trips 420 may include member trips that extend from the origin 104 and the destination 106 and have been identified from the trip log 402. Suppose the origin information for the origin 104 is given by A and the destination information for the destination 106 is given by C. The third trip 408, the fourth trip 410, the seventh trip 416 and the eighth trip 418 may be selected from the trip log. Accordingly, the identification may be made based on the origin information and/or the destination information.

Additionally or alternatively, a set of trips 420 may be identified from the trip log 402 based on a path distance between the origin 104 and the destination 106. The path distance may be received by the data receiving module 224 from one or more of the vehicle systems 208 and/or the vehicle sensors 210. For example, the path distance may be received from the navigation system 232. The path distance may also be calculated. For example, the path distance may be calculated from the position determination unit 218, the navigation system 232, or the vehicle sensors 210.

In some embodiments, a trip may be identified as a member when the path distance exceeds a distance threshold, the corresponding trip may be identified as a member of a pattern from the trip log. Suppose that the distance threshold is 250 miles, then the third trip 408, the fourth trip 410, the fifth trip 412, the sixth trip 414, the seventh trip 416, and the eighth trip 418 may be identified as members of the set of trips 420. As the path distance may be given by other measures of trip length than mileage, so to the distance threshold may be given by other measures. For example, if the path distance is a given as a duration, the distance threshold may be given by a predetermined amount of time, such as three hours. Accordingly, in such an embodiment, the pattern module 226 may identify trips that have a duration that exceeds three hours.

In one embodiment, a trip may be identified as a member of the set of trips 420 when the path distance exceeds a distance threshold and the trip is repeated a predetermined number of times. The repetition may be unidirectional or a bidirectional. Unidirectional repetition are trips that start from the same origin and end at the same destination. An example of unidirectional repetition is given by the third trip 408 and the seventh trip 416 which start at the origin 104, given by the origin information, A, and end at the destination 106 given by the destination information, C. Bidirectional repetition are trips between the same two points but may start or end at either point. An example of bidirectional repetition is given by the third trip 408, the fourth trip 410, the seventh trip 416, and the eighth trip 418 because each of these trips is between the origin 104, given by the origin information, A, and end at the destination 106 given by the destination information, C.

Continuing the example from above, suppose that the distance threshold is 250 miles, however to be identified as a member of the set of trips, the trips must exhibit bidirectional repetition at least four times. Although, as discussed above, the third trip 408, the fourth trip 410, the fifth trip 412, the sixth trip 414, the seventh trip 416, and the eighth trip 418 satisfy the distance threshold, the fifth trip 412 and the sixth trip 414 are only bi-directionally repeated twice. Therefore, the pattern module 226 may identify a pattern of travel including the third trip 408, the fourth trip 410, the seventh trip 416, and the eighth trip 418 as members of the set of trips 420 based on the path distance and the a predetermined number of bidirectional repetition.

To determine a whether a second vehicle 422 can accommodate the pattern of travel, at block 306, the method 300 includes the prediction module 228 calculating a predictive range estimate 424 for the second vehicle 422. The predictive range estimate 424 is the range that the second vehicle 422 can travel before needing to be reenergized (e.g., refueled, recharged, etc.) based on the path distance and the driving conditions associated with the set of trips 420. The path distance may be determined from the trip log 402 or received the data receiving module 224. The driving conditions may also be received from the vehicle systems 208 and/or the vehicle sensors 210.

The driving conditions sources of motive energy consumption and parasitic energy consumption from non-motive vehicle systems of the first vehicle 102. The motive energy consumption is energy consumed by the first vehicle 102 in order to cause the first vehicle 102 to traverse the roadways. For example, the energy consumed by burning fuel to propel the first vehicle 102 forward or rearward is motive energy consumption. The parasitic energy consumption is energy consumed by the first vehicle 102 that does not contribute to the motion of the first vehicle 102. The parasitic energy consumption may include energy consumed by the environmental system 234 of the first vehicle 102. For example, air conditioning in a vehicle may include one or more of a condenser fan, blower, evaporator, and compressor to be active, all of which may consume additional energy but do not contribute to the motion of the vehicle. Accordingly, energy consumption associated with the air conditioning would be parasitic energy consumption.

Because the predictive range estimate 424 for the second vehicle 422 is based on the path distance and the driving conditions associated with the first vehicle 102, the driving conditions experienced in the first vehicle 102 affect the predictive range. Suppose, that a vehicle occupant of the first vehicle 102 uses the air conditioning while traversing the path distance. The motive energy consumption associated with traveling the path distance and the parasitic energy consumption of the air conditioning may be combined to determine the predictive range estimate 424. For example, the motive energy consumption and the parasitic energy consumption may be combined to determine a total energy consumption. The total energy consumption may be used to calculate the predictive range estimate 424 for the second vehicle 422 based on the energy efficiency of the second vehicle 422.

Because different vehicles consume energy differently based on the roadway conditions, the motive energy consumption may be based on both path distance as well as driving conditions. The driving conditions may include image data of at least a portion of a route between the origin and the destination. The image data from the first vehicle 102 may be used to determine a projected motive energy consumption for the second vehicle 422 based on the image data. The projected motive force may account for the different fuel consumption of the first vehicle 102 and the second vehicle 422. For example, suppose that the image data shows the first vehicle 102 climbing a hill. The second vehicle 422 may exert more or less motive force to traverse that hill. Accordingly, a projected motive energy consumption may also be identified to calculate the predictive range estimate 424.

The predictive range estimate 424 may also be based on the driving profile. As discussed above, the driving profile may be indicative of a vehicle occupant and/or consumer driving style. Supposed the driving style indicates that the first vehicle 102 is driven in a sporty manner. The prediction module 228 may calculate the predictive range estimate 424 based on an increased fuel usage associated with the sporty driving style. In this additional manner, a driver's current driving style of the first vehicle 102 can affect the calculation of the predictive range estimate 424 for the second vehicle 422.

The predictive range estimate 424 is an indication of the fraction of the maximum range of the second vehicle that would be consumed by the second vehicle 422 traversing the path distance. The predictive range estimate 424 may be a single value or a series of values. For example, the predictive range estimate 424 may be a score, such as a value on a range. The prediction value 438 may be a table, chart, graph, calculation, equation, and/or algorithm, among others. As will be discussed below with respect to FIG. 5, the predictive range estimate 424 may be a full cost benefit analysis of usage and/or ownership of the second vehicle 422 at a current time or during the future time.

At block 308, the method 300 includes comparing the predictive range estimate 424 to a maximum range of the second vehicle 422. The comparison may be the difference between the predictive range estimate 424 and the maximum range. The maximum range based on similar trips or received from a third party such as the manufacturer.

At block 310, the method 300 includes the prediction module 228 generating a range notification. The range notification may include providing the predictive range estimate 424 and/or the comparison of the predictive range estimate 424 to the maximum range of the second vehicle 422. In one embodiment, the range notification may be provided to a consumer through the first vehicle 102. For example, the range notification may be displayed by the infotainment system (not shown) of the vehicle systems 208.

Additionally or alternatively, the prediction module 228 may provide a notification such as audio cue or visual cue indicative of the range notification. In another embodiment, the range notification may be provided to portable device 240, shown in FIG. 2. As discussed above, the systems and methods described herein may be performed, operated, or facilitated by the portable device 240. For example, the portable device 240 may include the data receiving module 224, the pattern module 226, the prediction module 228, and the cost module 230. The portable device 240 may also include the position determination unit 218 and/or the navigation system 232 that operates in a similar manner as described above.

In some embodiments, the range notification may be sent in response to determining that the maximum range of the second vehicle 422 exceeds the predictive range estimate 424 by a buffer value. The buffer value may be a threshold value. In some embodiments, the buffer value may be the maximum range such that as long as the predictive range estimate 424 is less than the maximum range, the range notification is sent. Alternatively, the buffer value may be a percentage of the predictive range estimate 424 or the maximum range.

The range notification may then be provided to a potential consumer for the second vehicle 422 or a dealer of the second vehicle 422. Accordingly, the range notification may be used to educate a consumer about the benefits of the second vehicle 422 as compared to their first vehicle 102. For example, the consumer can be shown the potential financial costs and benefits of driving the prospective vehicle in the future, but in terms of their previous and/or current driving habits, destinations, and routines. In this manner, the consumer can better understand the benefits of usage and/or ownership of the second vehicle 422. This information could help consumers choose the second vehicle 422 at the point of sale with a better understanding of how the second vehicle 422 would fit the consumer's lifestyle.

Figure 5:
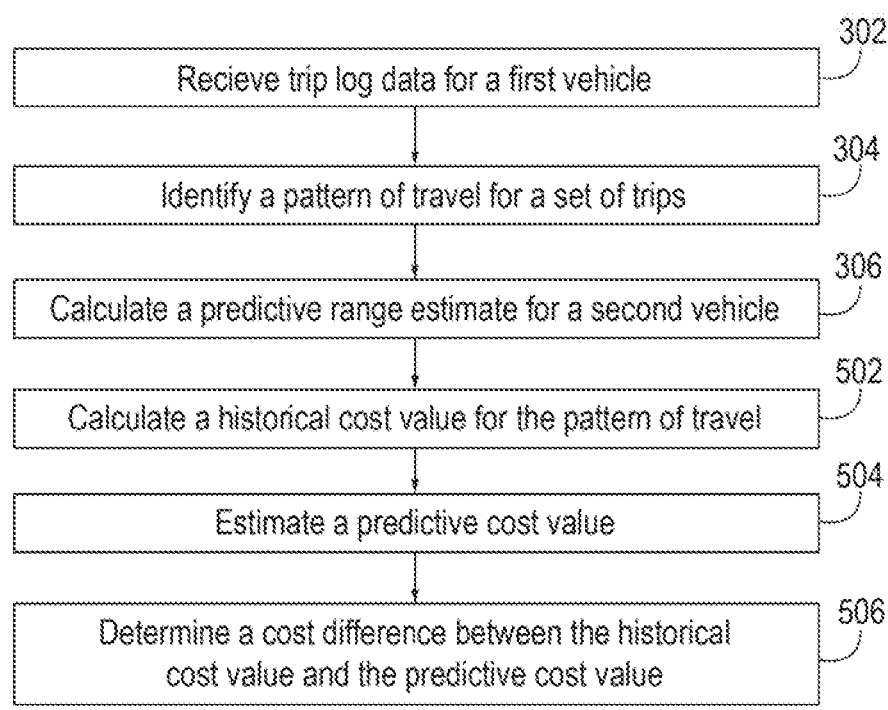
FIG. 5 is a process flow for estimating trip use for a prospective vehicle according to an exemplary embodiment.

FIG. 5 is a process flow for estimating trip use for a prospective vehicle according to an exemplary embodiment. The method 500 includes, at block 302, receiving a trip log 402 for the first vehicle 102. The method 500 also includes, at block 304, identifying a pattern of travel for a set of trips 420. The method 500 includes, at block 306, calculating a predictive range estimate. In this manner, the method 500 is similar to the method 300 and operates in a similar manner.

The method 500 further includes a cost analysis 426. In particular, the method 500 further includes, at block 502, the cost module 230 calculating a historical cost value 428 for the pattern of travel. For example, the historical cost value 428 may be calculated for the member trips of the set of trips 420. In one embodiment, the data receiving module 224 receiving historical energy pricing for energy for the times corresponding to the trips, such as the third trip 408, the fourth trip 410, the seventh trip 416, and the eighth trip 418. The historical cost value 428 may be based on information from the vehicle systems 208 and/or the vehicle sensors 210 to determine a cost of the energy consumption of the first vehicle 102. In another embodiment, the predictive cost value 430 may be based on the energy consumption of vehicles that are similar to the first vehicle 102. For example, the predictive cost value 430 may be based on the historical cost value 428 may be based on the path distance include energy pricing such as fuel costs for the first vehicle 102.

At block 504, the method 500 includes estimating a predictive cost value 430 for the second vehicle 422 based on alternative energy pricing for the second vehicle 422. For example, the alternative energy pricing associated with the second vehicle 422 may be different than the conventional energy pricing associated with the first vehicle 102. Suppose that the first vehicle 102 is a conventional vehicle and conventional energy pricing is a price for gasoline, while the second vehicle 422 is an electric vehicle and that the alternative energy pricing includes values associated with the price per kilowatt-hour. The alternative energy pricing may include values that are indicative of the price per kilowatt-hour based on the time of year, the day of the week, the time of day, etc. For example, the price per kilowatt-hour may be lower during the day time. Additionally or alternatively, the alternative energy pricing or the conventional energy pricing may be an average of these values.

At block 506, the method 500 includes the cost module 230 determining a cost difference 432 between the historical cost value 428 and the predictive cost value 430. For example, the cost module 230 may calculate the historical cost value 428 by applying the historical energy pricing to the fuel and/or charge expended by the first vehicle 102 during a trip, such as the first trip 404 and/or the second trip 406. The predictive cost value 430 can then be subtracted from the historical cost value 428 to determine the cost difference 432. Therefore, the range notification may additionally include the cost difference 432 to further inform a consumer that not only is the second vehicle 422 able to accommodate the consumer's routine travel, but also may offer a cost benefit.

Figure 6:
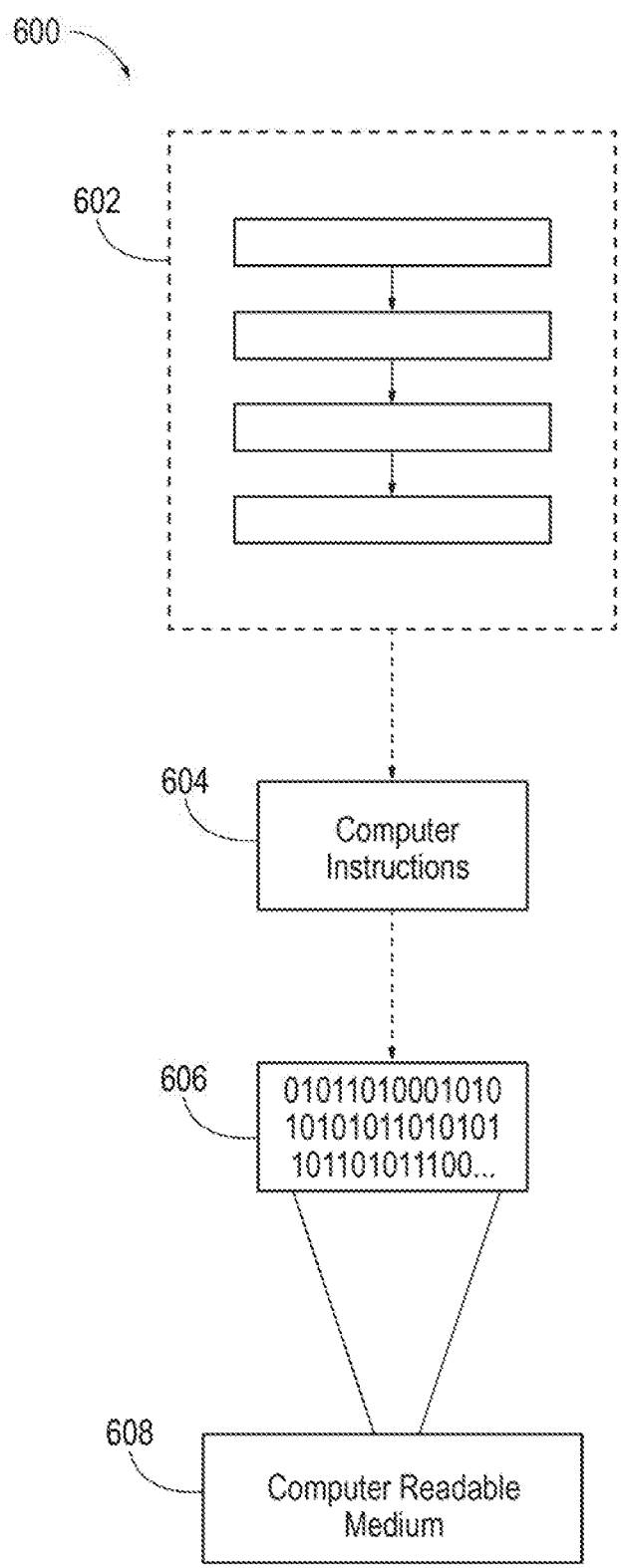
FIG. 6 is an illustration of an example computer-readable medium including processor-executable instructions according to an exemplary embodiment.

Still another aspect involves a computer-readable medium including processor-executable instructions configured to implement one aspect of the techniques presented herein. An aspect of a computer-readable medium or a computer-readable device devised in these ways is illustrated in FIG. 6, wherein an implementation 600 includes a computer-readable medium 608, such as a CD-R, DVD-R, flash drive, a platter of a hard disk drive, etc., on which is encoded computer-readable data 606. This encoded computer-readable data 606, such as binary data including a plurality of zero's and one's as shown in 606, in turn includes a set of processor-executable computer instructions 604 configured to operate according to one or more of the principles set forth herein. In this implementation 600, the processor-executable computer instructions 604 may be configured to perform a method 602, such as the method 300 of FIG. 3 or the method 500 of FIG. 5. In another aspect, the processor-executable computer instructions 604 may be configured to implement a system, such as the operating environment of FIG. 2 and FIG. 4. Many such computer-readable media may be devised by those of ordinary skill in the art that are configured to operate in accordance with the systems and methods presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processing unit, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

The embodiments discussed herein may also be described and implemented in the context of computer-readable storage medium storing computer executable instructions. Computer-readable storage media includes computer storage media and communication media. For example, flash memory drives, digital versatile discs (DVDs), compact discs (CDs), floppy disks, and tape cassettes. Computer-readable storage media may include volatile and nonvolatile, removable and non-removable media implemented in any method or technology for storage of information such as computer readable instructions, data structures, modules or other data. Computer-readable storage media excludes non-transitory tangible media and propagated data signals.

The invention claimed is:

1. A computer-implemented method for estimating trip use for a prospective vehicle, comprising:
    receiving trip log data for a first vehicle, wherein the trip log data includes vehicle data associated with driving conditions for a plurality of trips;
    identifying a pattern of travel for a set of trips of the plurality of trips, wherein trips from the set of trips traveled from an origin to a destination, and wherein a trip of the set of trips has a path distance between the origin and the destination that exceeds a distance threshold;
    calculating a predictive range estimate for a second vehicle for travel between the origin and the destination based on the path distance and the driving conditions associated with the set of trips; and
    displaying a range notification based on the predictive range estimate, wherein the range notification is a visual cue on a display of an infotainment system.

2. The computer-implemented method of claim 1, wherein the driving conditions include parasitic energy consumption from non-motive vehicle systems of the first vehicle.

3. The computer-implemented method of claim 1, wherein the driving conditions include image data of at least a portion of a route between the origin and the destination, the method of claim 1 further comprising:
    determining a projected motive energy consumption based on the image data, wherein calculating the predictive range estimate is based on the projected motive energy consumption.

4. The computer-implemented method of claim 1, further comprising evaluating the trip log data of the first vehicle and determining a driving profile associated with the second vehicle, wherein calculating the predictive range estimate is further based on the driving profile.

5. The computer-implemented method of claim 1, further comprising:
    comparing the predictive range estimate to a maximum range of the second vehicle; and
    generating a range notification in response to determining that the maximum range exceeds the predictive range estimate by a buffer value.

6. The computer-implemented method of claim 5, wherein the buffer value is a percentage of the predictive range estimate or the maximum range.

7. The computer-implemented method of claim 1, further comprising:
    calculating a historical cost value for the pattern of travel based on historical energy pricing for the first vehicle;
    estimating a predictive cost value for the second vehicle based on alternative energy pricing for the second vehicle, wherein the alternative energy pricing is different than the historical energy pricing; and
    determining a cost difference between the historical cost value and the predictive cost value.

8. The computer-implemented method of claim 7, further comprising generating a range notification that includes the cost difference.

9. The computer-implemented method of claim 1, wherein the trip log data includes navigation data received from a portable device.

10. A system for calculating a prediction value for usage of a prospective vehicle, comprising:
    a data receiving module, implemented via a processor, receives trip log data for a first vehicle, wherein the trip log data includes vehicle data associated with driving conditions for a plurality of trips;
    a pattern module, implemented via the processor, identifies a pattern of travel for a set of trips of the plurality of trips, wherein trips of the set of trips traveled from an origin to a destination, and wherein a trip of the set of trips has a path distance between the origin and the destination that exceeds a distance threshold;
    a prediction module, implemented via the processor, calculates a predictive range estimate for a second vehicle for travel between the origin and the destination based on the path distance and the driving conditions associated with the set of trips; and
    a display of an infotainment system configured to display a range notification based on the predictive range estimate.

11. The system of claim 10, wherein the driving conditions include parasitic energy consumption from non-motive vehicle systems of the first vehicle.

12. The system of claim 10, wherein the driving conditions include image data of at least a portion of a route between the origin and the destination, and the prediction module is further configured to determine a projected motive energy consumption based on the image data, wherein calculating the predictive range estimate is based on the projected motive energy consumption.

13. The system of claim 10, wherein the prediction module is further configured to evaluate the trip log data of the first vehicle and determining a driving profile associated with the second vehicle, wherein calculating the predictive range estimate is further based on the driving profile.

14. The system of claim 10, wherein the prediction module is further configured to compare the predictive range estimate to a maximum range of the second vehicle, and generate a range notification in response to determining that the maximum range exceeds the predictive range estimate by a buffer value.

15. The system of claim 10, further comprising a cost module, implemented via the processor, configured to:
    calculate a historical cost value for the pattern of travel based on historical energy pricing for the first vehicle;
    estimate a predictive cost value for the second vehicle based on alternative energy pricing for the second vehicle, wherein the alternative energy pricing is different than the historical energy pricing; and
    determine a cost difference between the historical cost value and the predictive cost value.

16. A non-transitory computer readable storage medium storing instructions that, when executed by a computer, which includes at least a processor, causes the computer to perform a method for estimating trip use for a prospective vehicle, the method comprising:
    receiving trip log data for a first vehicle, wherein the trip log data includes vehicle data associated with driving conditions for a plurality of trips;
    identifying a pattern of travel for a set of trips of the plurality of trips, wherein trips of the set of trips traveled from an origin to a destination, and wherein a trip of the set of trips has a path distance between the origin and the destination that exceeds a distance threshold;

calculating a predictive range estimate for a second vehicle for travel between the origin and the destination based on the path distance and the driving conditions associated with the set of trips; and displaying a range notification based on the predictive range estimate, wherein the range notification is a visual cue on a display of an infotainment system.

17. The non-transitory computer readable storage medium of claim 16, wherein the driving conditions include parasitic energy consumption from non-motive vehicle systems of the first vehicle.

18. The non-transitory computer readable storage medium of claim 16, wherein the driving conditions include image data of at least a portion of a route between the origin and the destination, the method of claim 1 further comprising:

determining a projected motive energy consumption based on the image data, wherein calculating the predictive range estimate is based on the projected motive energy consumption.

19. The non-transitory computer readable storage medium of claim 16, further comprising:

comparing the predictive range estimate to a maximum range of the second vehicle; and generating a range notification in response to determining that the maximum range exceeds the predictive range estimate by a buffer value.

20. The non-transitory computer readable storage medium of claim 16, further comprising:

calculating a historical cost value for the pattern of travel based on historical energy pricing for the first vehicle;

estimating a predictive cost value for the second vehicle based on alternative energy pricing for the second vehicle, wherein the alternative energy pricing is different than the historical energy pricing; and determining a cost difference between the historical cost value and the predictive cost value.

\* \* \* \* \*